(No Model.) 3 Sheets—Sheet 1.
E. FULLFORD & H. T. VAN LAUN.
REGENERATIVE GAS BURNER.
No. 400,072. Patented Mar. 26, 1889.
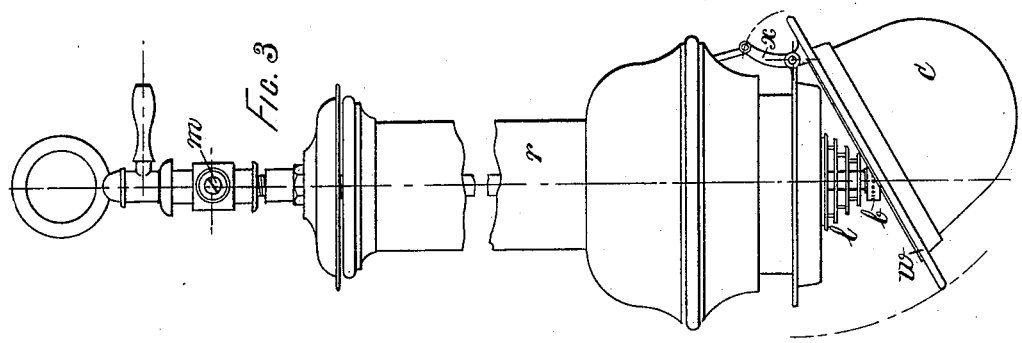
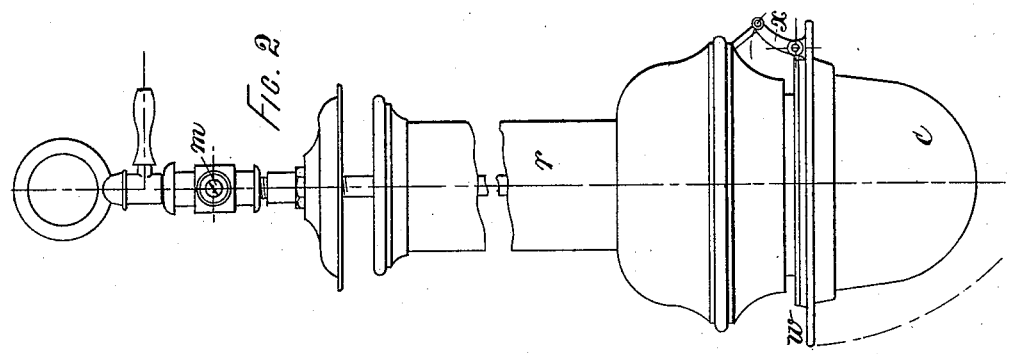
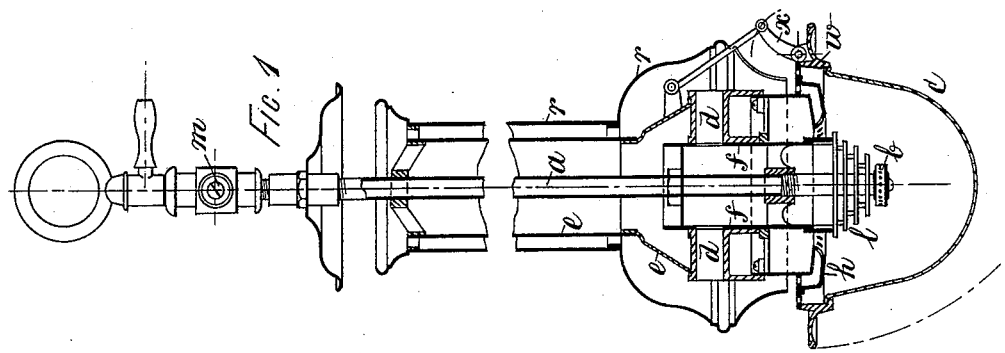

(No Model.) 3 Sheets—Sheet 2.
E. FULLFORD & H. T. VAN LAUN.
REGENERATIVE GAS BURNER.
No. 400,072. Patented Mar. 26, 1889.
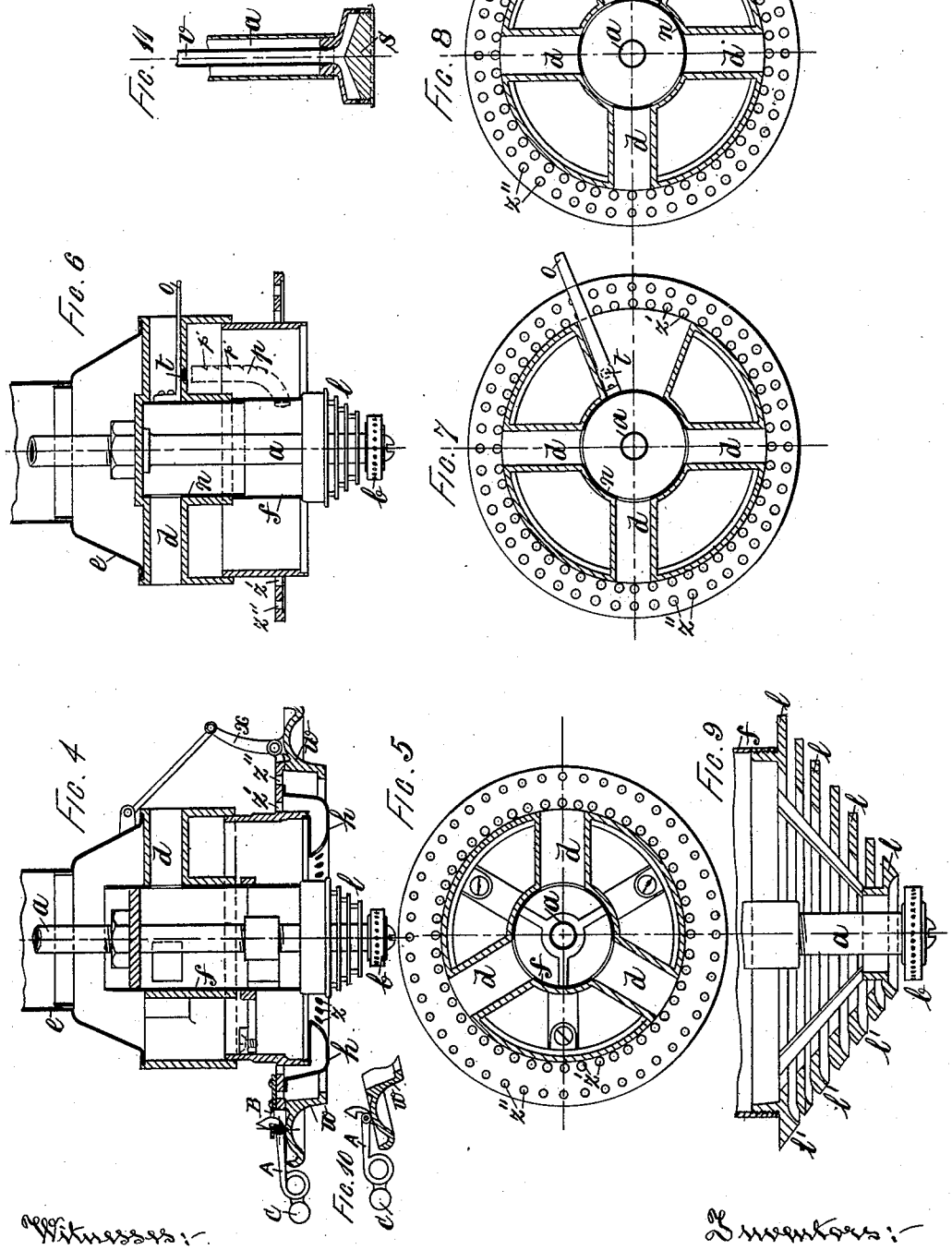
Witnesses:
Chas. G. Mills.
Herman Niegfeldt.
Inventors:
Edwin Fullford
Henry T. Van Laun
By Wm. H. Babcock
Attorney.

(No Model.) 3 Sheets—Sheet 3.
E. FULLFORD & H. T. VAN LAUN.
REGENERATIVE GAS BURNER.
No. 400,072. Patented Mar. 26, 1889.
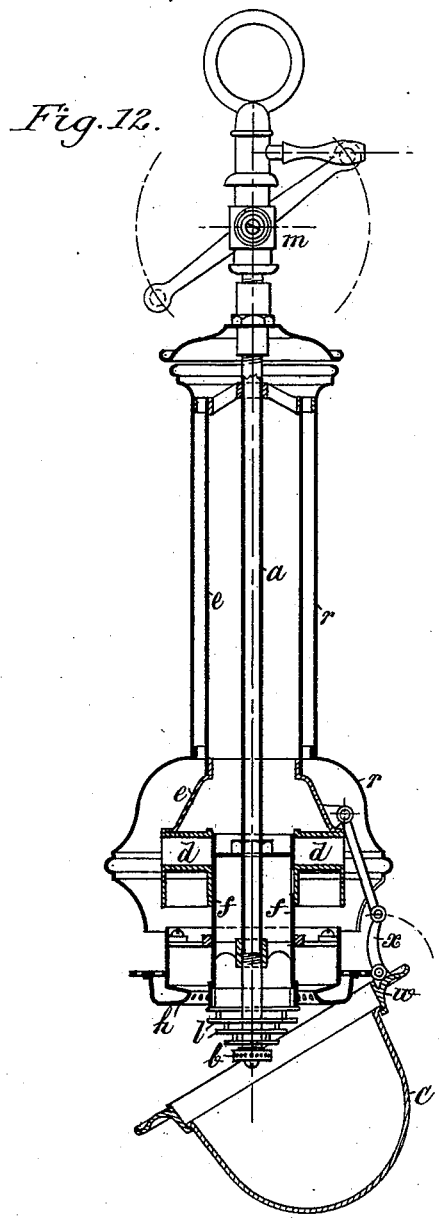
Fig. 12.
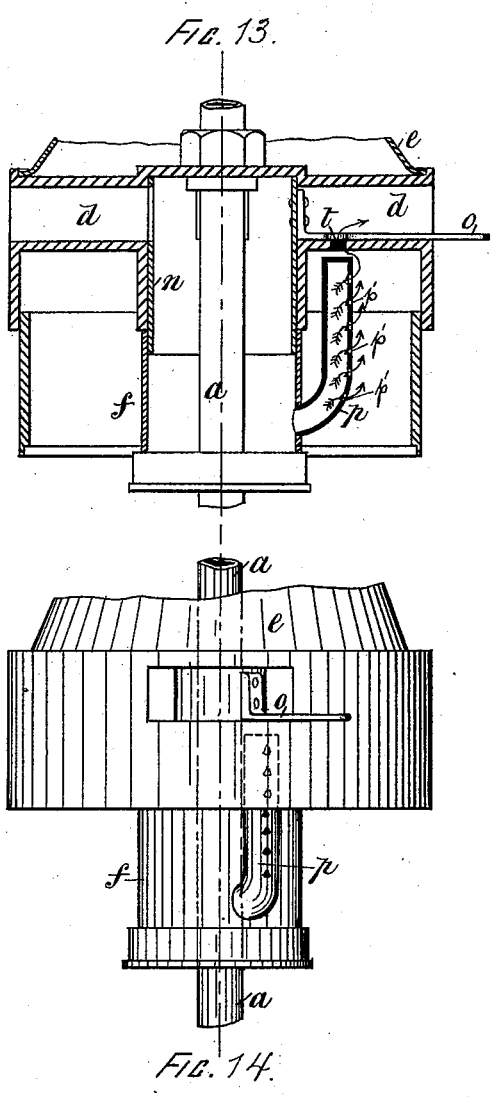
Fig. 13.
Fig. 14.

UNITED STATES PATENT OFFICE.

EDWIN FULLFORD AND HENRY THEODORE VAN LAUN, OF LONDON, ENGLAND.

REGENERATIVE GAS-BURNER.

SPECIFICATION forming part of Letters Patent No. 400,072, dated March 26, 1889.

Application filed July 18, 1888. Serial No. 280,264. (No model.) Patented in Belgium May 3, 1888, No. 81,678.

*To all whom it may concern:*

Be it known that we, EDWIN FULLFORD and HENRY THEODORE VAN LAUN, engineers, subjects of the Queen of Great Britain, both of The Minories, in the city of London, England, have invented certain new and useful Improvements in Regenerative Gas-Lamps; and we do hereby declare the following to be a full, clear, and exact description of the invention, (for which we have obtained a patent in Belgium, No. 81,678, May 3, 1888,) reference being had to the accompanying drawings, which form part of this specification.

This invention relates to new and useful improvements in regenerative gas-lamps, in which air is supplied to the flame after having been first heated in passing through the lamp.

The said invention consists in the construction and combination of devices hereinafter particularly set forth and claimed.

In the accompanying drawings, Figure 1 represents a vertical section of a lamp embodying our invention and suspended from or under the ceiling of a room to be lighted. Fig. 2 represents an elevation of the same with the globe closed, and Fig. 3 an elevation of the same with the globe opened. Fig. 4 represents a vertical section through the lower part of the lamp, upon a larger scale. Fig. 5 represents a horizontal section through the same. Fig. 6 represents a vertical section through a somewhat modified form of the lower part of the same. Fig. 7 represents a horizontal section through the same with the air-passages open, and Fig. 8 represents a similar horizontal section with the air-passages closed. Fig. 9 represents, on a still larger scale, a vertical section through the part of the lamp by which air is supplied above the burner. Fig. 11 represents a vertical section through a modified form of burner. Fig. 12 is a view similar to Fig. 1, but showing the tube $d$ and chimney $e$ in their raised position. Fig. 13 is a view similar to Fig. 6, but on a larger scale, showing the tube $p$ in full lines and presenting the holes therein more distinctly. Fig. 14 represents an elevation of the devices shown in Figs. 6 and 13.

The same letters of reference indicate the same parts in the several figures.

In the said drawings, $a$ is a central pipe, through which gas is supplied to a burner, $b$, contained in a transparent globe or bowl, $c$, air being admitted above the flame through passages $d$ in the side of a chimney, $e$, surrounding and concentric with a smaller air-pipe, $f$, the passages $d$ passing transversely through the space between the chimney $e$ and the inner pipe, $f$, so that the heated air and products of combustion pass between and round the passages $d$ as they ascend the chimney, the air admitted through the passages passing down the pipe $f$, and thence through the spaces between a conical set of parallel plates, $l$, to the upper side of the flame, while air is also admitted to the outer or lower side of the flame through holes $z$, Fig. 4, in a hollow annular chamber, $h$, and ordinarily having its lower side enameled, so that it serves as a light-reflector, the air entering the chamber $h$ through holes $z'$ in a flange which carries it, and to which is also hinged the ring or frame $w$, which supports the glass globe or bowl $c$. Air is also admitted into the globe or bowl $c$ through holes $z''$ in the flange. The heated air from the central pipe, $f$, passes to the upper side of the flames between the thin horizontal circular plates $l\ l\ l$, Fig. 9, which are arranged parallel, but at a short distance apart, so as to leave narrow spaces between them, and they increase in diameter as they rise, so that collectively they form a hollow cone having a series of narrow concentric openings round its inclined sides. The upper or largest plate $l$ is connected to the lower end of the pipe $f$, and the lower or smallest plate $l$ fits round the gas-pipe $a$, preferably leaving a space between them, through which air passes, the lower side of the plate being somewhat hollowed out, as shown in Fig. 9, so that the air is deflected down upon the flame close to the burner $b$. Air passing in through the lateral passages $d$ and down the central air-pipe, $f$, becomes highly heated, and it becomes still more heated as it passes between the plates $l$, which are themselves heated by the flame from the burner.

The parallel plates $l$ may be formed in one piece connected together by suitable bars or brackets, as shown in Fig. 9, or they may be made separate and screwed or otherwise attached together by distance-pieces, as shown in Figs. 1, 3, 4, and 6.

Instead of the plates $l$ and the passages between them being horizontal, they may be curved down at their outer edge, as shown at $l'\ l'\ l'$ in Fig. 9, so as to deflect downward the heated air passing between them; or, instead of plates $l$, a solid cone may in some cases be used, having a large number of narrow vertical slits round its outer inclined surface.

In order to light lamps of the kind described, the gas is first admitted to the burner $b$ by means of a cock, $m$, Figs. 1, 2, and 3, and if the chimney $e$ is not then hot there is no upward draft through it, and the gas from the burner is liable to pass up through the air-pipe $f$, and when the globe $c$ is opened and a light applied an explosion occurs, and until the chimney $e$ becomes hot and an upward draft through it established the gas burns imperfectly and without giving light. To prevent this, we fit into and above the pipe $f$ a concentric tube, $n$, Figs. 6, 7, and 8, having openings through it corresponding in size and position with the transverse passages $d$, so that if the tube $n$ be turned partly round the air-passages $d$ can be completely opened or closed, as required, as shown in Figs. 7 and 8, respectively. A lateral opening is made through the outer casing of the lamp, so that a lever or handle, $o$, Figs. 6, 7, and 8, attached to the movable tube $n$, can pass through it and serve to turn the tube $n$ round backward or forward to open or close the passages $d$ and admit or cut off the supply of air. The passage through which the lever $o$ passes between the inner air-tube and the outer chimney or casing is closed at the top and bottom and sides, with the exception of a small hole, $t$, through which gas from the burner $b$ rises by means of a pipe, $p$, (shown in dotted lines,) which is closed at its upper end, but has a series of lateral holes, $p'$, through which the gas escapes, as indicated by the arrows, Fig. 13, and passes up through the hole $t$, above which it is lighted, the flame being carried down outside the pipe $p$ until it ignites the gas outside the plates $l$ without explosion, and as the air-supply through the passages $d$ is entirely cut off any back-draft through them is impossible, and a proper draft up through the chimney $e$ is speedily established without difficulty, the passages $d$ being then opened by the lever $o$. The hole $t$ is closed by a cover forming part of or attached to the lever $o$, so that when the passages $d$ are open the hole $t$ is closed, as shown in Fig. 7, while when the passages $d$ are closed the hole $t$ is open, as shown in Fig. 8.

A somewhat modified method of opening and closing the air-passages $d$ is shown in Figs. 4 and 5, the inner tube, $f$, being fixed, and the passages $d$, together with the chimney $e$ and outer casing, being raised or lowered, in order to close or open the air-passages $d$, the gas being ignited by a light applied when the chimney is raised and the openings $d$ consequently closed. The ring or frame $w$, which carries the glass globe $c$ and is hinged to the lower flange of the lamp, is partially opened in order to ignite the gas issuing from the burner $b$.

In Figs. 1, 2, 3, and 4, $x$ is an arm or lever fixed to the frame $w$ near the hinge, and connected by a link to the chimney $e$. When, therefore, the frame $w$ is lowered to light the gas at the burner $b$, the chimney $e$ and the passages $d$ are automatically raised and close the openings into the tube $f$, so as to prevent a back-draft, as already described, and when the frame $w$ is closed, after lighting the gas, the chimney $e$ is automatically lowered and the openings into the tube $f$ are opened, so as to allow the draft up the chimney $e$ to be established. The outer side of the ring or frame $w$, opposite to the hinge, is provided with a catch or fastening. In Fig. 4 such a catch or fastening is shown, so constructed that the weight of the frame $w$ and globe $c$ is supported by the hooked handle or rod used by an attendant to open the frame in order to light the lamp.

A is a lever hinged to the frame $w$, and having upon it a catch which enters and engages with a slot in the piece B upon the lower fixed flange of the lamp.

C is a balance-weight upon the lever A, which also has a ring or hook, by which it can be raised by a hooked handle or rod. When the lever is thus lifted to disengage the catch and open the frame $w$, as shown in Fig. 10, the weight of the frame and globe $c$ is supported, and they are prevented from falling when the catch becomes disengaged.

The burner $b$ may be of any of the ordinary well-known kinds. In Figs. 1, 3, 4, 6, and 9 it is shown as having a chamber, to which the gas is admitted from the pipe $a$ and escapes through a horizontal ring of small holes round the chamber. In Fig. 11 the chamber is shown closed below by a plug, $s$, having an internal cone, the lower edge of which is just below the ring of holes, so that any unconsumed particles of carbon accumulating in the angular space round the cone are more easily blown out with the gas.

$v$ is a small inner gas-supply pipe, open at its upper end and contained in the supply-pipe $a$. By this arrangement the gas is kept cool and travels more quickly, and the risk of depositing carbon in the pipe and burner is lessened.

Having thus described our invention, what we claim is—

1. The combination of the gas-pipe $a$ and burner $b$, transparent globe or bowl $c$, with the tube $f$, chimney $e$, having the outlet-passages $d$, and mechanism for raising and lowering said chimney, substantially as set forth.

2. The combination of the hinged frame $w$, lever or arm $x$, and link, with the chimney $e$, having rising and falling passages $d$ movable therewith, and supporting devices for said chimney and said frame, whereby the lowering of the latter raises the former, substantially as set forth.

3. The combination, with the tube $f$ and burner $b$, of the perforated pipe $p$ and a casing having in its top above said pipe the hole $t$, substantially as set forth.

In testimony that we claim the foregoing we have hereunto set our hands this 4th day of July, 1888.

EDWIN FULLFORD.
HENRY THEODORE VAN LAUN.

Witnesses:
ARTHUR E. EDWARDS,
R. D. BLOOMFIELD.